US007996781B2

(12) United States Patent
Zaliva

(10) Patent No.: US 7,996,781 B2
(45) Date of Patent: Aug. 9, 2011

(54) LIST ENTRY SELECTION FOR ELECTRONIC DEVICES

(76) Inventor: Vadim Zaliva, Fremont, CA (US)

( * ) Notice: Subject to any disclaimer, the term of this patent is extended or adjusted under 35 U.S.C. 154(b) by 572 days.

(21) Appl. No.: 11/965,098

(22) Filed: Dec. 27, 2007

(65) Prior Publication Data

US 2008/0250352 A1 Oct. 9, 2008

Related U.S. Application Data

(60) Provisional application No. 60/921,690, filed on Apr. 4, 2007, provisional application No. 60/952,859, filed on Jul. 30, 2007.

(51) Int. Cl.
*G06F 3/00* (2006.01)
*G06F 9/00* (2006.01)
*G06F 17/00* (2006.01)
(52) U.S. Cl. ......... 715/762; 715/780; 715/864; 715/763
(58) Field of Classification Search .......... 715/765, 715/812, 780, 864, 865, 866, 762, 763, 764
See application file for complete search history.

(56) References Cited

U.S. PATENT DOCUMENTS

| | | | | |
|---|---|---|---|---|
| 6,950,994 | B2 * | 9/2005 | Dharap | 715/864 |
| 7,152,213 | B2 * | 12/2006 | Pu et al. | 715/812 |
| 2001/0043238 | A1 * | 11/2001 | Guerrero | 345/853 |
| 2002/0026524 | A1 * | 2/2002 | Dharap | 709/236 |
| 2003/0160828 | A1 * | 8/2003 | Treibach-Heck et al. | 345/780 |
| 2007/0050337 | A1 * | 3/2007 | Venkataraman et al. | 707/3 |

OTHER PUBLICATIONS

"This is Not a Brain Surgery—Address book lookup using 5-way pad," Live Journal Blog, Mar. 24, 2005, can be retrieved at http://notbrainsurgery.livejournal.com/19002.html.
"Multi-tap," Wikipedia, Jan. 23, 2009, [online] [Retrieved on Feb. 8, 2009] Retrieved from the internet <URL:http://en.wikipedia.org/wik/Multi-tap>.
Mackenzie, I. S., et al., "Text Entry for Mobile Computing: Models and Methods, Theory and Practice," Human-Computer Interaction, 2002, p. 149-198, vol. 17, No. 2 & 3.

* cited by examiner

*Primary Examiner* — Tadeese Hailu
*Assistant Examiner* — Anita D Chaudhuri
(74) *Attorney, Agent, or Firm* — Craig W. Schmoyer

(57) ABSTRACT

A system (and method) for selecting an entry from a list of entries on an electronic device is disclosed. The system is configured to display a plurality of banks to a user and to receive a bank selection event from the user for selecting a bank containing a set of characters. The user creates a bank selection event through an input device such as a navigation device or touch screen. The set of characters is appended to a prefix that is used to determine a current result list containing entries that match the prefix. The list of entries is reduced to the current result list and displayed to the user with the portions of the entries matching the prefix highlighted. After the list of entries is reduced to a desired size, the user enters a scrolling mode where the user scrolls through the list of entries and selects an entry.

17 Claims, 11 Drawing Sheets

| 1 | 2 | 3 |
|---|---|---|
| Q W E R T Y U I O P | Z X C V B N M | Q W E R T Y U I O P |

LIST ENTRY SELECTION FOR ELECTRONIC DEVICES

CROSS REFERENCE TO RELATED APPLICATIONS

This application claims the benefit of U.S. Provisional Application No. 60/921,690, filed Apr. 4, 2007, which is incorporated by reference in its entirety. This application also claims the benefit of U.S. Provisional Application No. 60/952,859, filed Jul. 30, 2007, which is incorporated by reference in its entirety.

BACKGROUND

1. Field of Art

The disclosure generally relates to the field of computing device user interfaces and more specifically, to enabling a user to select an entry from a list of entries.

2. Description of the Related Art

Portable electronic devices, also referred to as mobile devices, often have a small screen with limited viewing area and a small keyboard with a limited number of keys. This makes it difficult to perform quick searches and selections in lists such as an address book or song list containing more than a few items. For example, suppose that a user needs to find a name in an address book on a mobile phone to make a call. The phone can present the user with a list of names that the user scrolls through with up and down keys until the desired name is reached. In some cases, keys may be available to jump up or down by several names at once. Still, if the list contains more than a few screens of entries, scrolling through it to reach a desired name becomes impractical.

If the phone has a full keyboard, the user may try to enter the name with the keyboard. However, the keyboard on a mobile device is small and likely to be slow and difficult to use. Some devices have design where the keyboard is normally hidden and has to be slid out or opened to be used. This results in additional time to access the keyboard. In some devices, a virtual keyboard can also be displayed on a touch screen. This keyboard is also likely to be small and difficult to use. Additionally, a stylus may be needed to use the virtual keyboard, resulting in time needed to take out and to put back the stylus.

It is possible to use a standard phone numeric keypad to search for and select a name. A numeric key is associated with certain letters and a user accesses these letters by pressing the key repeatedly. For example, the "4" key is usually associated with the letters "G", "H", and "I," and the user would access "G" by pressing the key once, "H" by pressing the key twice, and "I" by pressing the key three times. This is referred to as the multi-tap method of letter selection.

One method of selecting a name from a list is Multi-Tap First, where a user selects the first letter of the name using the multi-tap method. Once the first letter is selected, the cursor is positioned to the first entry starting with this letter, and the user then scrolls down to the desired entry. Another method is Multi-Tap Match, where a user can type the first several letters of a name using the multi-tap method. As the user types each new letter, the cursor moves to the first name that matches the typed prefix. At some point, the user can choose to enter a scrolling mode where the user then scrolls down to the desired name. However, these methods based on multi-tap require many button presses and require the user to differentiate between eight or more keys.

What is needed is an efficient and easy to use method for selecting an entry from a list of entries on an electronic device.

SUMMARY

Disclosed is a system (and/or method) for selecting an entry from a list of entries on an electronic device is disclosed. The system is configured to display a plurality of banks to a user and to receive a bank selection event from the user for selecting a bank containing a set of characters. The user creates a bank selection event through an input device such as a navigation device or touch screen. The set of characters is appended to a prefix that is used to determine a current result list containing entries that match the prefix. The list of entries is reduced to the current result list and displayed to the user with the portions of the entries matching the prefix highlighted. After the list of entries is reduced to a desired size, the user enters a scrolling mode where the user scrolls through the list of entries and selects an entry. A predetermined action is then performed on the selected entry.

The disclosed system provides several advantages. A user can select an entry from a list of entries easily and efficiently. Entries can be selected by providing a relatively small number user inputs to an input device that fits in a small area and has a simple user interface. The user is not required to look at the display of the device when selecting an entry and can operate the device using one hand.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 7 illustrates the prefix that is matched to create the current result list displayed in FIG. 5.

DETAILED DESCRIPTION

Reference will now be made in detail to several embodiments, examples of which are illustrated in the accompanying figures (FIGS.). It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
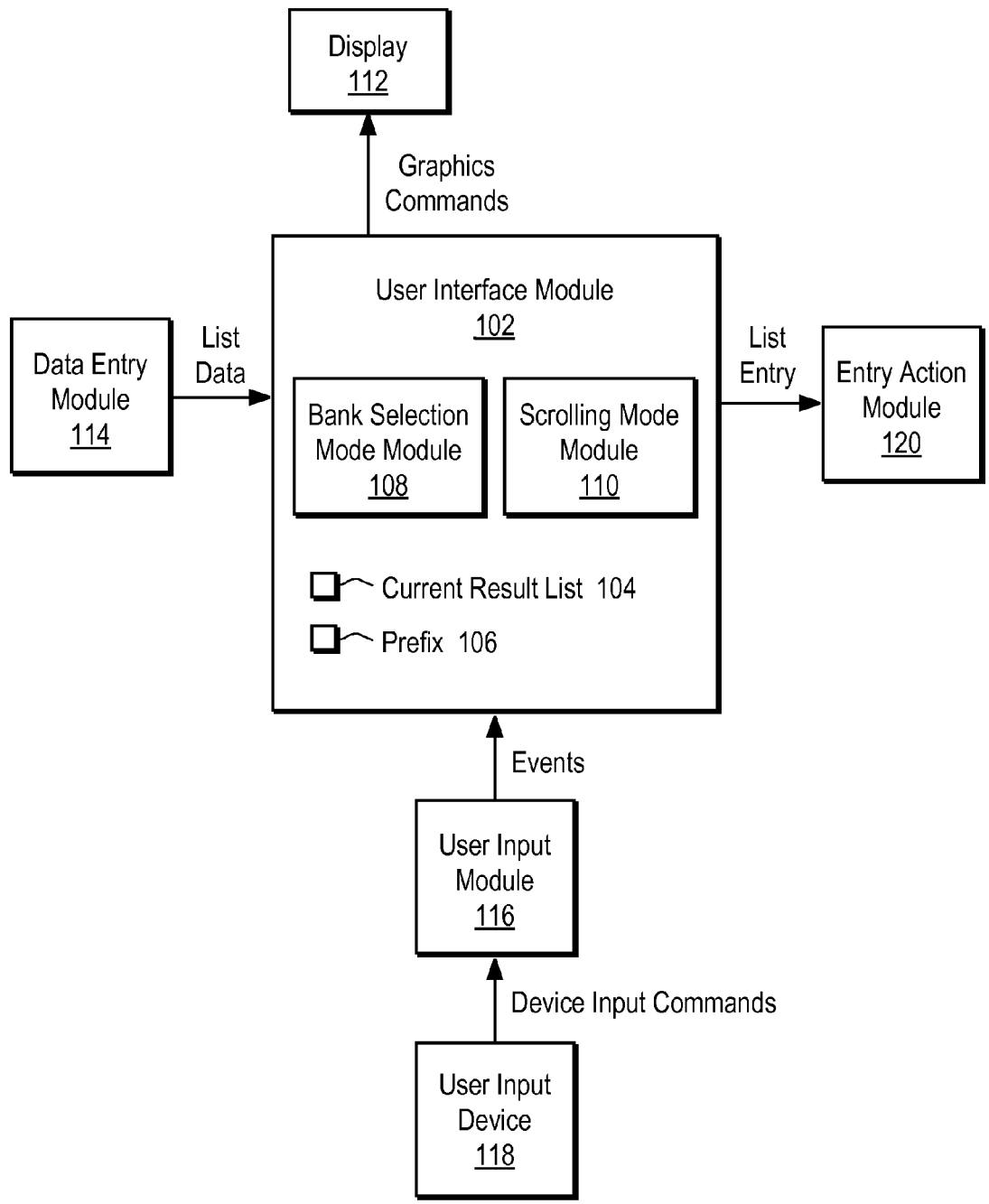
FIG. 1 illustrates a system for enabling a user to select an entry from a list of entries on an electronic device.

FIG. 1 illustrates a system 100 for enabling a user to select an entry from a list of entries on an electronic device. Examples of electronic devices include computers, cable television boxes, global positioning system (GPS) devices, mobile phones, portable media players, and handheld computers. The system is comprised of various modules which can run on the electronic device. The electronic device includes a processor, memory, storage, and other hardware and software to run the modules of the system 100.

The list from which a user selects an entry can be, for example, a list of names of persons, a list of song names, a list of file names, or a list of words. The user generally selects an entry for the purpose of performing some action relating to that entry. For example, the user may select a name from a list to call a phone number associated with the name or to retrieve an address associated with the name. In another example, the user may select a word from a list containing several commonly used words to insert that word into an e-mail the user is composing.

Each list entry is a string of characters, where the characters can be letters from any alphabetic system, numbers, or any other symbols. The characters can be encoded in various ways such as ASCII or Unicode. In the description that follows, the list in Appendix A is used to illustrate the selection of an entry from a list and is referred to as the Example List. The Example List contains names of persons, where the names are comprised mostly of letters. In the description that follows, any reference to names composed of letters is understood to equally apply to general strings of characters.

List data is provided by the data entry module 114. List data includes the character string entries described above and data associated with each entry. For example, an entry can be the name of a person and the associated data can be the person's phone number and address. The associated data is used to perform an action when the entry is selected, such as calling the phone number associated with a selected name. List data can be received from a variety of sources. The data may reside on local storage of the electronic device that is loaded into memory by the data entry module. The data may be downloaded from the Internet or another device. The data can be created from Caller ID information of received phone calls. The data can also be manually entered by a user, for example through a keyboard on the electronic device.

The user interface module 102 provides a user interface for a user to select an entry from a list. The user interface module sends graphics commands to a display 112 that provides visual information to the user during the entry selection process. An example of a display is a liquid crystal display (LCD) screen on a electronic device.

The user interface module accepts input commands from a user input device 118. The user input device can be can be a touchpad, joystick, a 4-way or 5-way navigation control, a touch screen, or any of a variety of input methods provided by the electronic device. The device input commands are processed by a user input module 116 before being sent to the user interface module. The user input module produces events understood by the user interface module based on the device input commands. Some of the events include bank selection events, a scrolling mode entry event, cursor up and down events, an entry selection event, a backspace event, and a reset event. These events are described further below.

Once a user has selected an entry via the user interface module, the entry is sent to the entry action module 120. The entry action module performs an appropriate action on the selected entry, possibly using data associated with the entry. For example, as mentioned above, the entry action module may dial a phone number associated with a selected entry.

Entry Selection User Interface

Figure 2:
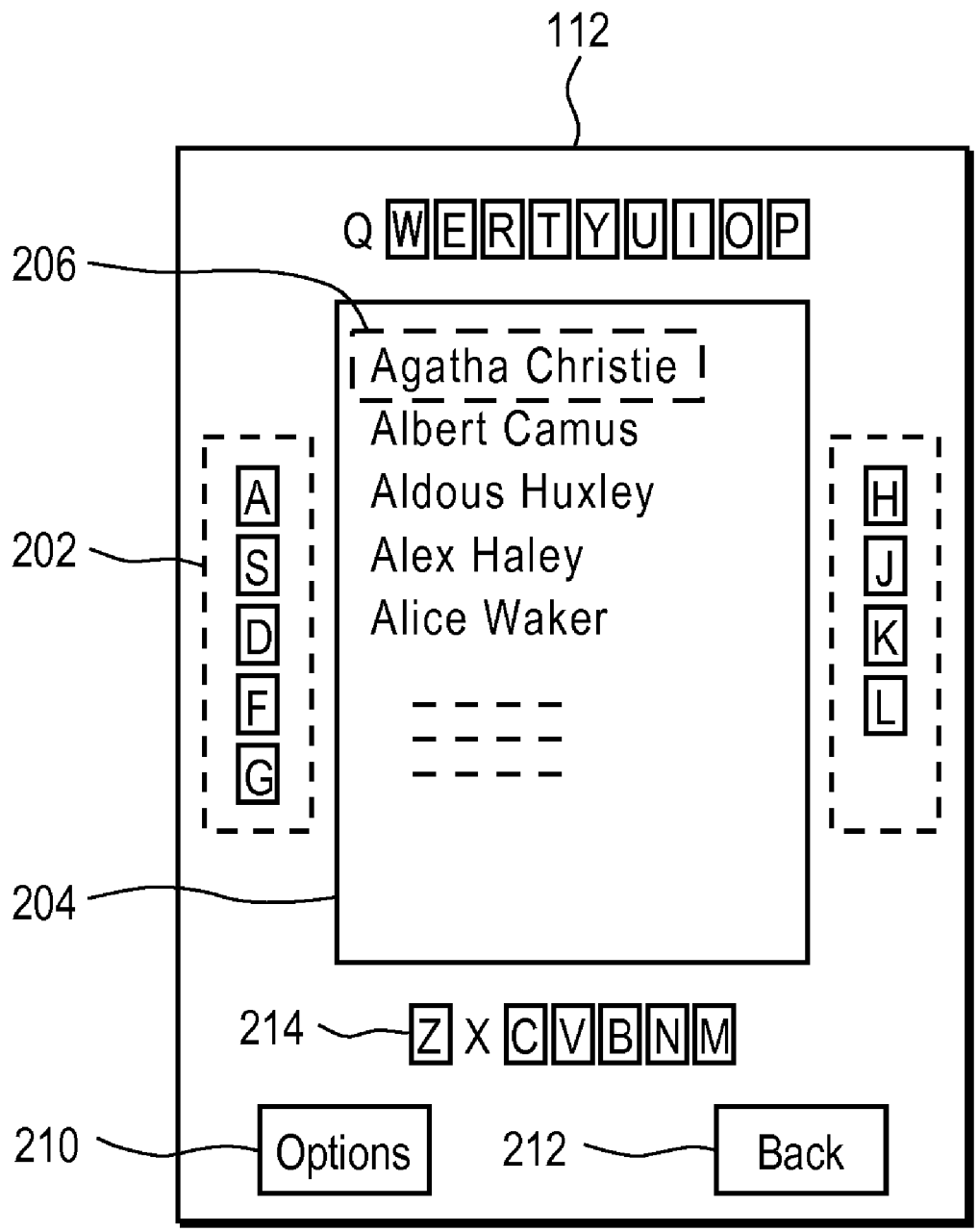
FIG. 2 illustrates a display screen on an electronic device for selecting an entry from a list.

FIG. 2 illustrates a portion of a display screen 112 of an electronic device. The contents of the display screen are controlled by graphics commands from the user interface module 102. The list display region 204 contains entries 206 from the current result list 104. The current result list contains the list entries that are currently available for selection. Initially, the user interface module receives the complete list from the data entry module 114 and stores this list as the current result list. When the user interface module receives bank selection events, described below, various entries are ruled out as candidates for selection and are removed from the current result list, shortening the current result list. When the entry selection process is restarted, the current result list 104 is reset to the complete list.

The list display region 204 can display the entries 206 of the current result list 104 in any order desired. The list display region may not be able to display all of the entries of the current result list. Though the current result list in FIG. 2 contains 96 entries (see Appendix A), the list display region 204 shows only ten entries due to space constraints. A variety of options are possible for choosing which entries to show in the list display region 204. In one embodiment, the list is sorted as desired and the first ten sorted entries are chosen to be displayed.

The user interface for entry selection occurs in two modes: bank selection mode and scrolling mode. At the start of the entry selection process, the user interface is in bank selection mode. The bank selection mode module 108 handles the user interface in this mode. The bank selection module 108 receives events from the user input module 116 (passed through the user interface module 102) that can cause the number of entries in the current result list 104 to be reduced. When current result list has been reduced to a manageable number of entries, such as when all or most of the current result list can fit on a single screen 204, the user can provide input that causes a scrolling mode entry event to be sent to the user interface module.

When a scrolling mode entry event is received, the user interface enters scrolling mode, controlled by the scrolling mode module 110. In scrolling mode, the user can navigate through the list display region 204 and select a particular entry by providing input that causes certain events to be sent to the scrolling mode module 110 (through the user interface module 102). Further description of bank selection mode and scrolling mode is given below.

The list display region 204 is surrounded by letter banks 202. These banks contain groups of characters that can appear in the list entries. In the example display shown in FIG. 2, the banks include all the letter from the English alphabet. The banks do not need to include all symbols in the list and a single symbol in a bank can map to multiple symbols in the list. For example, spaces and periods appear in the list entries but not in the banks. Also, for example, the symbol E in the upper bank maps to both uppercase E and lowercase e in the list entries.

In FIG. 2, the example configuration illustrates four banks displayed at the four edges of the list display area 204. The QWERTYUIOP bank is referred to as the upper bank, the ASDFG bank is referred to as the left bank, the HJKL bank is referred to as the right bank, and the ZXCVBNM bank is referred to as the lower bank. These banks are selected when bank selection events are received by the bank selection mode module 108. A bank selection event is also referred to as a directional event because a bank can be specified by its location relative to the list display area 204 (e.g., upper bank, left bank). The user of directional banks enables a user to produce bank selection events by entering simple inputs on an electronic device. There are four banks as opposed to twenty six letters, making bank selection simpler than individual letter selection with a keyboard. Input mechanisms are further described in the user input module 116 description below.

Before a first bank is selected, the current result list 104 displayed in the list display area 204 is the complete list provided by the data entry module 114. The first received bank selection event narrows the current result list to those entries containing one of the letters in the selected bank at certain predefined positions. These positions can be, for example, the start of the first, middle, or last name of the entry. In one embodiment, there is no position restriction, so that one of the letters from the selected bank can appear anywhere in the entry, such as in the middle of a last name.

In FIG. 2 and the figures that follow, the first selected bank must include a letter that is the first letter of the first, middle, or last name of a particular entry for that entry to remain in the current result list. For example, if the right bank is selected, the current result list is narrowed down to those items with first, middle, or last names beginning with H, J, K, or L. As another example, "Agatha Christie" will remain in the current result list after the first bank selection if the left bank (containing 'A') or the lower bank (containing 'C') is chosen.

Some letters in the banks 202 may be highlighted 214. A highlighted letter may be shown as bolder or a different color than non-highlighted letters. In one embodiment, highlighted letters are displayed normally while non-highlighted letters are "grayed out." A symbol is highlighted if there are any list items in the current candidate list that would match that particular letter if the bank containing the letter were selected. In FIG. 2, all letters are highlighted except for "Q" and "X." This is because all other letters in the banks correspond to the first letter of at least one first, middle, or last name from the Example List. The highlighted letters show the user which letters from a bank can be possible matches if that bank is selected next.

The display area 112 also includes on-screen buttons 210 and 212 that provide additional functionality to users. These buttons can be selected by user inputs causing various events to be sent from the user input module 116 to the user interface module 102. The button 210 titled "Options" can open a menu enabling the user to set certain options for the display 112 such the highlighting colors or list sorting preferences. The user input module can send various configuration events to the user interface module. The back button 212 can undo the most recent event received, such as a bank selection event. The user input module can send an undo event to the user interface module.

Figure 3:
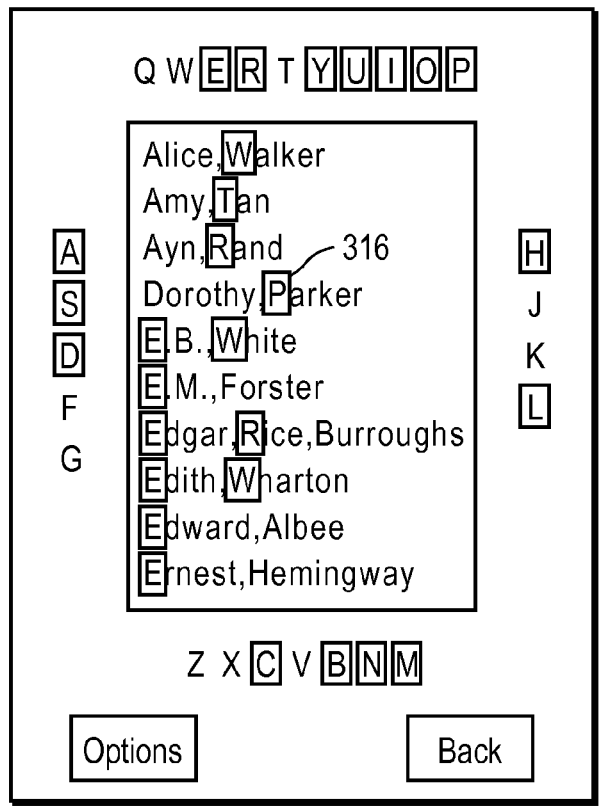
FIG. 3 illustrates the display screen of FIG. 2 after a bank selection event.

Suppose that the user wants to find someone in the Example List whose name (first, last, or middle) is "O'Connor". The user, when selecting a first bank, would select the upper bank since that contains 'O', the first letter of the name. After receiving the first bank selection event for the upper bank, the display illustrated in FIG. 3 is shown to the user. The current result list 104 has been narrowed to those items that have first, middle, or last names starting with Q, W, E, R, T, Y, U, I, O, or P, since the upper bank was selected.

Certain letters in the entries 206 have been highlighted 316 to show the matches with the first upper bank selection. In some cases, an entry may have multiple matches. For example, "E. B. White" matches twice because the first name starts with E and the last name starts with W, both from the upper bank. In such cases, both letters are highlighted.

After the first bank selection, the user interface can remain in bank selection mode or can enter scrolling mode. Assuming that the user chooses to remain in bank selection mode, the user again provides an input producing a bank selection event. For this second bank selection, the user is choosing a bank containing a letter following a previously matched letter in the entry the user wants to select. For example, to match "Alice Walker" in the second bank selection, the user would need to select the left bank, since it contains 'A', which would match the 'a' following the 'W' matched in the first bank selection. Symbols appearing in the list items but not in the banks are ignored. For example, for the item "E. B. White", the next possible matching symbol after 'E' is 'B', not the period.

The bank letters that are highlighted 214 in FIG. 3 are different than those highlighted 214 in FIG. 2. This is because the highlighted bank letters now correspond to possible matches in the position following the previously matched position. For example, 'H' matches the 'h' following the previously matched 'W' in 'Edith Wharton' and as a result 'H' is highlighted in the bank ('H' also has matches in other list items).

Figure 4:
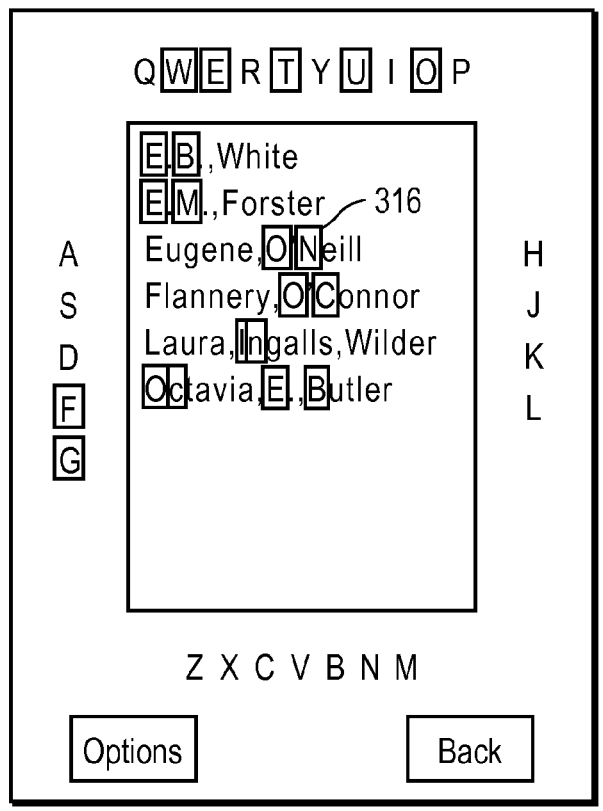
FIG. 4 illustrates the display screen of FIG. 3 after another bank selection event.

The user searching for "O'Connor" would select the lower bank containing 'C' for the second bank selection. This results in the display shown in FIG. 4. The current result list is narrowed further to those entries that match after the second bank selection. Matching list items must contain a letter from the first selected bank followed by a letter from the second selected bank. The highlighting in the display list area and highlighting in the banks illustrated in FIG. 4 provide the user with similar indications to those described in FIG. 3. Subsequent bank selections operate similarly, causing the result list to be shortened and the highlighting of the banks and the current result list to change.

Figure 5:
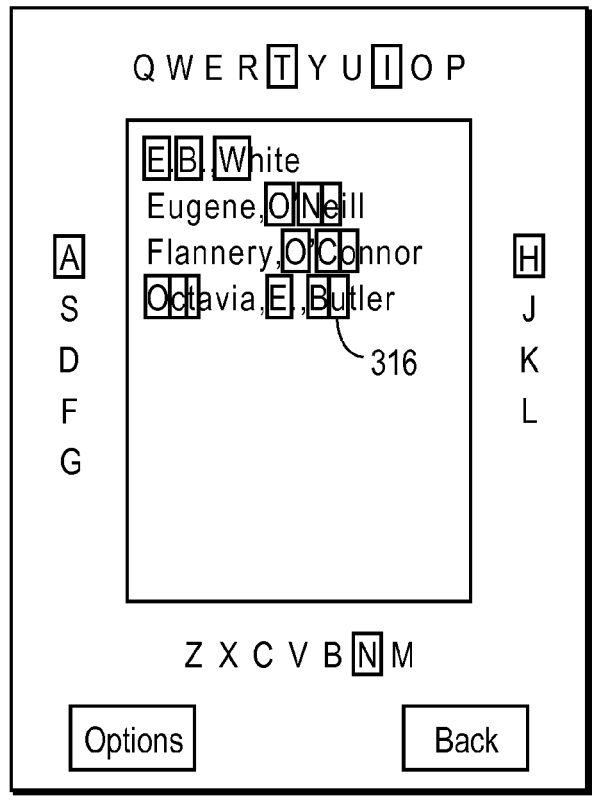
FIG. 5 illustrates the display screen of FIG. 4 after another bank selection event.
Figure 6:
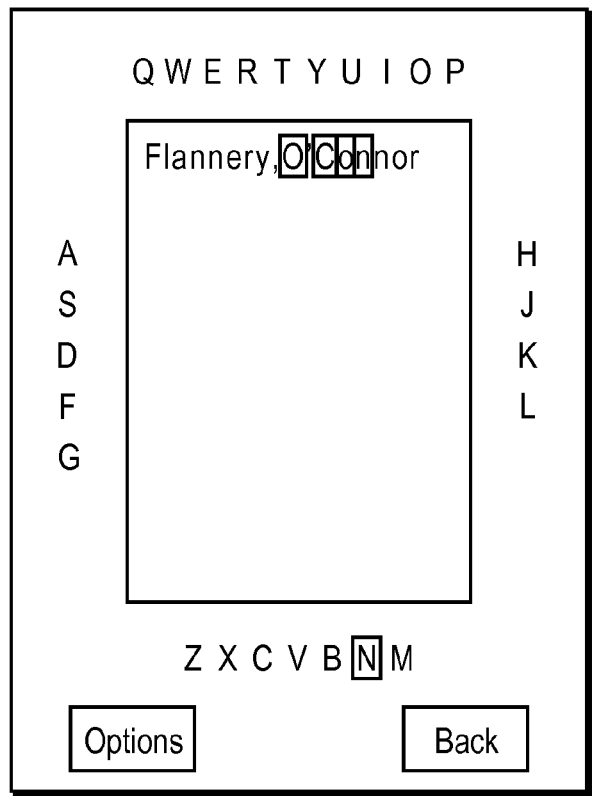
FIG. 6 illustrates the display screen of FIG. 5 after another bank selection event.

The user may want to further narrow the result list by selecting another bank. To continue the search for "O'Connor" the user would select the upper bank containing 'O' as the third bank selection. The result of this selection is illustrated in FIG. 5. The user would then select the bottom bank containing 'N'. The result of this fourth selection is illustrated in FIG. 6. At this point, the current result list has been narrowed down to the single desired entry. In most cases, the user would choose to exit bank selection mode and enter scrolling mode before reaching the screen illustrated in FIG. 6. For example, the user may choose to enter scrolling mode after reaching the screen illustrated in FIG. 4 (after two bank selections), since the current result list at that point contains only six names that the user can easily scroll through.

In bank selection mode, the current result list 104 is narrowed through prefix matching. Each bank selection event results in the selected bank being appended to the prefix 106 that is matched with the entries of the current result list. A prefix matches an entry of the current result list if the banks in the prefix match adjacent letters in the entry (subject to restrictions on the position of the first matching letter described above). For example, after the third bank selection event, the prefix is three banks long and therefore must match three adjacent letters in an entry. Since each bank contains multiple letters, there are multiple letter sequences that will match a given prefix of banks.

Figure 7:
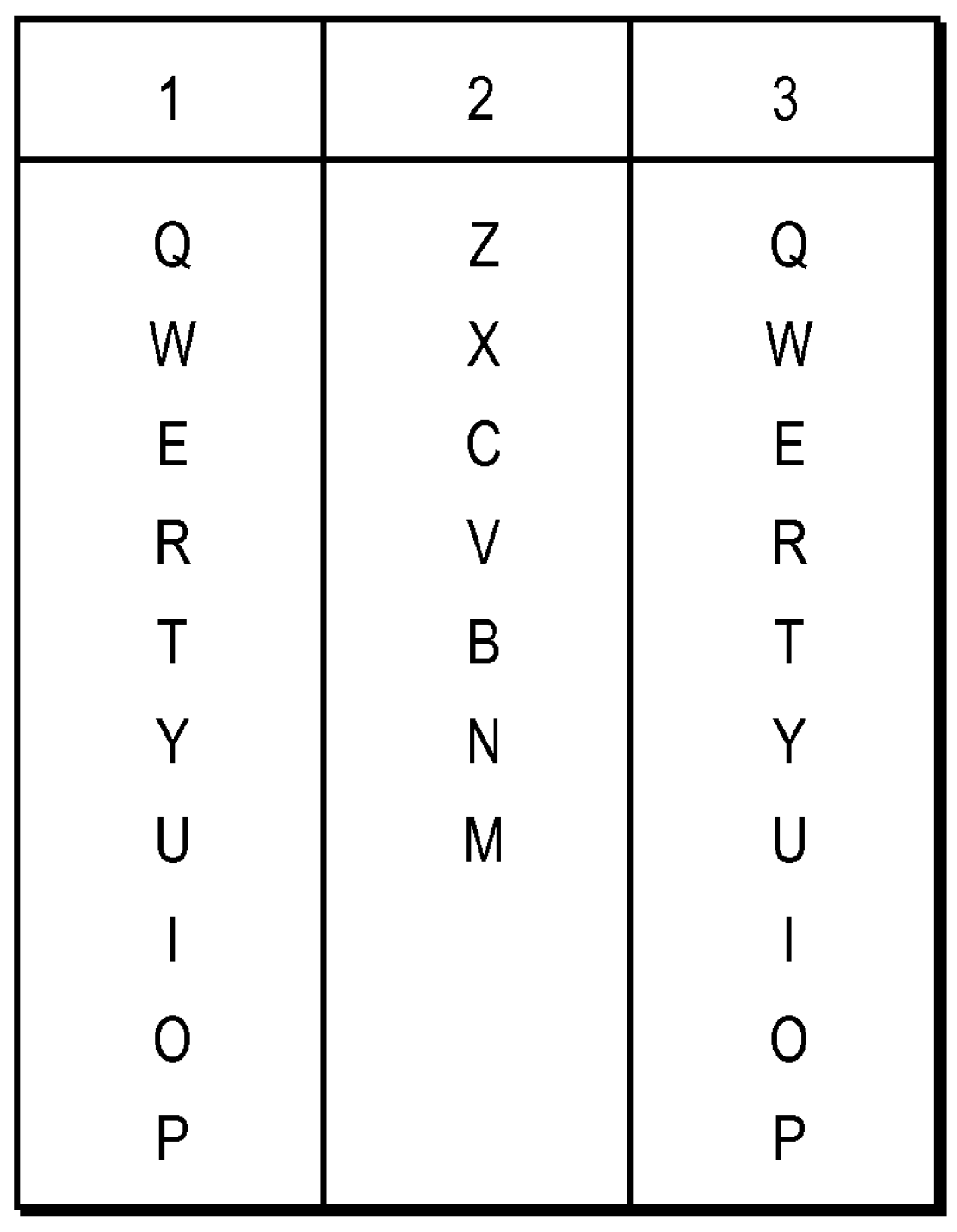

FIG. 7 illustrates the prefix 106 that is matched to create the current result list displayed in FIG. 5. As described above, FIG. 5 is reached after selecting the left bank, the lower bank, and then the left bank again. The letters from these banks are shown in positions 1, 2, and 3 of the prefix in FIG. 7. For an entry to match the prefix in FIG. 7, it must contain one letter from position 1 followed by one letter from position 2 followed by one letter from position 3. All of the displayed entries in FIG. 5 match this prefix.

In the illustrated embodiment, the letters in the entries matching the prefix must be consecutive (excluding nonletter characters) but do not need to be contained in the same name within the entry. This is referred to as permitting multiple word selection. For example, in FIG. 5, "E. B. White" is part of the current result list because the consecutive letters 'E', 'B', and 'W' match the first three bank selections (i.e., the prefix). Even though the 'E' is from the first name, the 'B' is from the middle name, and the 'W' is from the last name, the match is not affected. By allowing multiple word selection, the user can continue to narrow down the current result list by bank selections even when the end of a word is reached.

Figure 8:
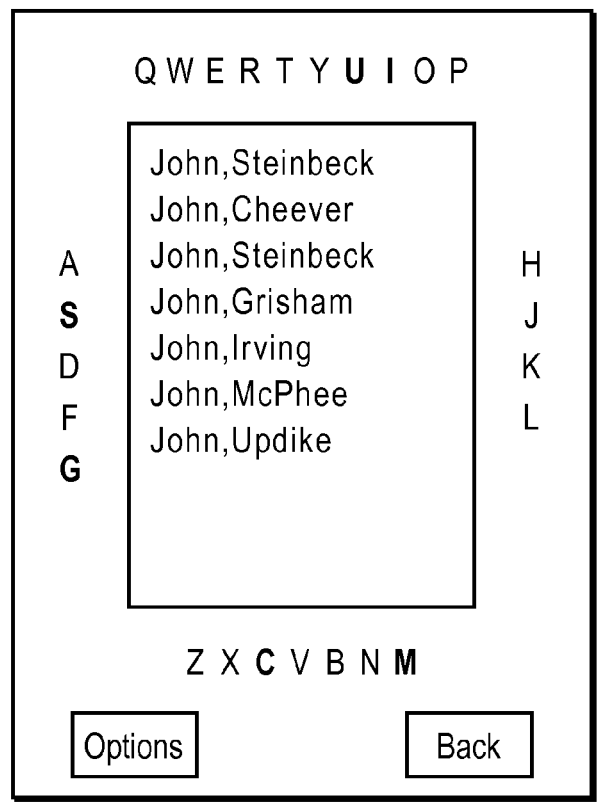
FIG. 8 illustrates a portion of a display screen with a current result list that can be reduced further through multiple word selection.

Another example where multiple word selection is useful is shown in FIG. 8, where the current result list after four bank selections includes several persons with the same first name. If multiple word selection were not permitted, the user could not further narrow the current result list through further bank selection events, and would instead need to enter scrolling mode to select an entry.

Multiple word selection can also be permitted where the prefix has completely matched the (same) last names of several entries. After the last name is matched, the prefix matching wraps around to the first name. This wrapping may be useful, for example, if a sequence of bank selections have matched several persons with the same last name and the user wants to continue making bank selections to further reduce the current result list based on the first name.

Figure 9:
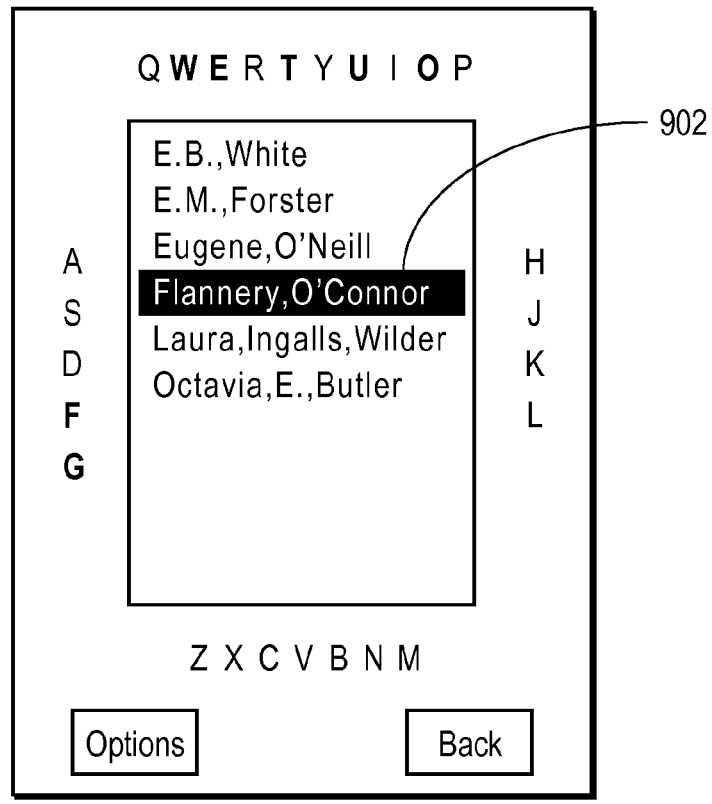
FIG. 9 illustrates the display screen of FIG. 4 after a scrolling mode entry event.

As mentioned above, the user can enter scrolling mode at any time with an input that sends a scrolling mode entry event to the user interface module. Usually, the user will do this when the current result list has been reduced to a few entries that can be easily navigated. FIG. 9 illustrates a display 112 in scrolling mode entered after the bank selection resulting in FIG. 4. In scrolling mode, one of the entries in the current result list is highlighted with a cursor 902. In one embodiment, the cursor is initially at the first entry when scrolling mode is entered. Alternatively, the cursor is initially placed in the middle of the current result list.

The cursor 902 can be moved from an one item to an adjacent item through cursor up and cursor down events generated by user inputs. When the cursor has been moved to the desired entry, the user can create an entry selection event to select the entry and send the entry to the entry action module 120. As described above, the entry action module carries out a desired action on the entry, such as dialing a phone number. If the display 112 is touch sensitive, the user can produce an entry selection event by directly touching the entry on the display instead of providing inputs to move the cursor up and down. In one embodiment, when the user interface enters scrolling mode with the current result list already narrowed to a single entry, that entry is automatically selected.

When in scrolling mode, the current result list may contain more entries than can be displayed in the list display area 204. The user can reach the undisplayed items by moving the cursor down beyond the bottom displayed entry to scroll the display area to the undisplayed entry. In one embodiment, the display 100 provides an indication to the user that there are more entries in the current result list than are shown in the list display area so that the user knows to scroll down to display all entries (if desired). The user may also be able to generate page up or page down events to move through a long list of entries more rapidly.

Figure 10:
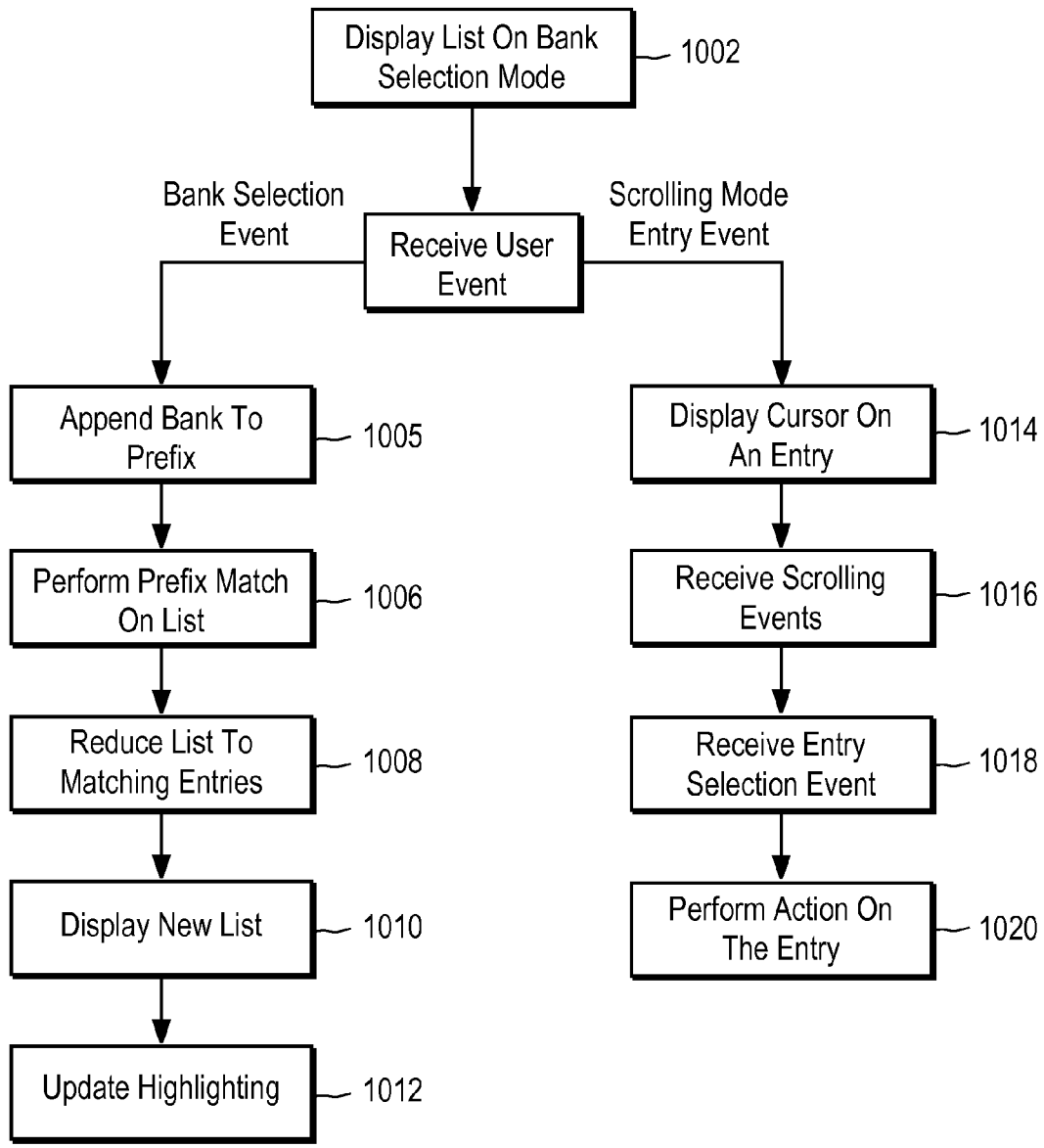
FIG. 10 is a flowchart showing the steps for selecting an entry from a list, in one embodiment.

FIG. 10 is a flowchart showing the steps for selecting an entry from a list, in one embodiment. The user interface module 102 displays 1002 the list from which the user is to choose an entry. The user interface is in bank selection mode. The user interface module receives 1004 an event generated by the user. If the event is a bank selection event, the selected bank is appended 1005 to the prefix 106. A prefix match is then performed 1006 on the current result list entries. The current result list is reduced 1008 to those entries matching the prefix and this list is displayed 1010 to the user in the list display area 204. The highlighting of the banks 202 and list entries 206 is updated 1012 based on the new prefix and current result list. As the user continues to generate bank selection events, the prefix becomes longer and matches fewer entries resulting in a shorter current result list.

After making zero or more bank selections, the user generates a scrolling mode entry event. Upon entering scrolling mode, a cursor is displayed 1014 on an entry in the current result list. Scrolling events such as cursor up or cursor down are received 1016 from the user input module to move the cursor to a desired entry. An entry selection event is received 1018 when the user has reached the desired entry and wishes to select that entry. A predefined appropriate action is then performed 1020 on the desired entry by the entry action module 120.

User Input

As described above, the user provides input to the electronic device through a user input device 118. Generally the user input device is part of the electronic device, such as a keypad or navigation panel on the electronic device. The user input device sends device input commands to the user input module 116. The user input module interprets these input commands and creates events that can be understood by the user interface module 102. The user input module then sends these events to the user interface module.

Figure 11:
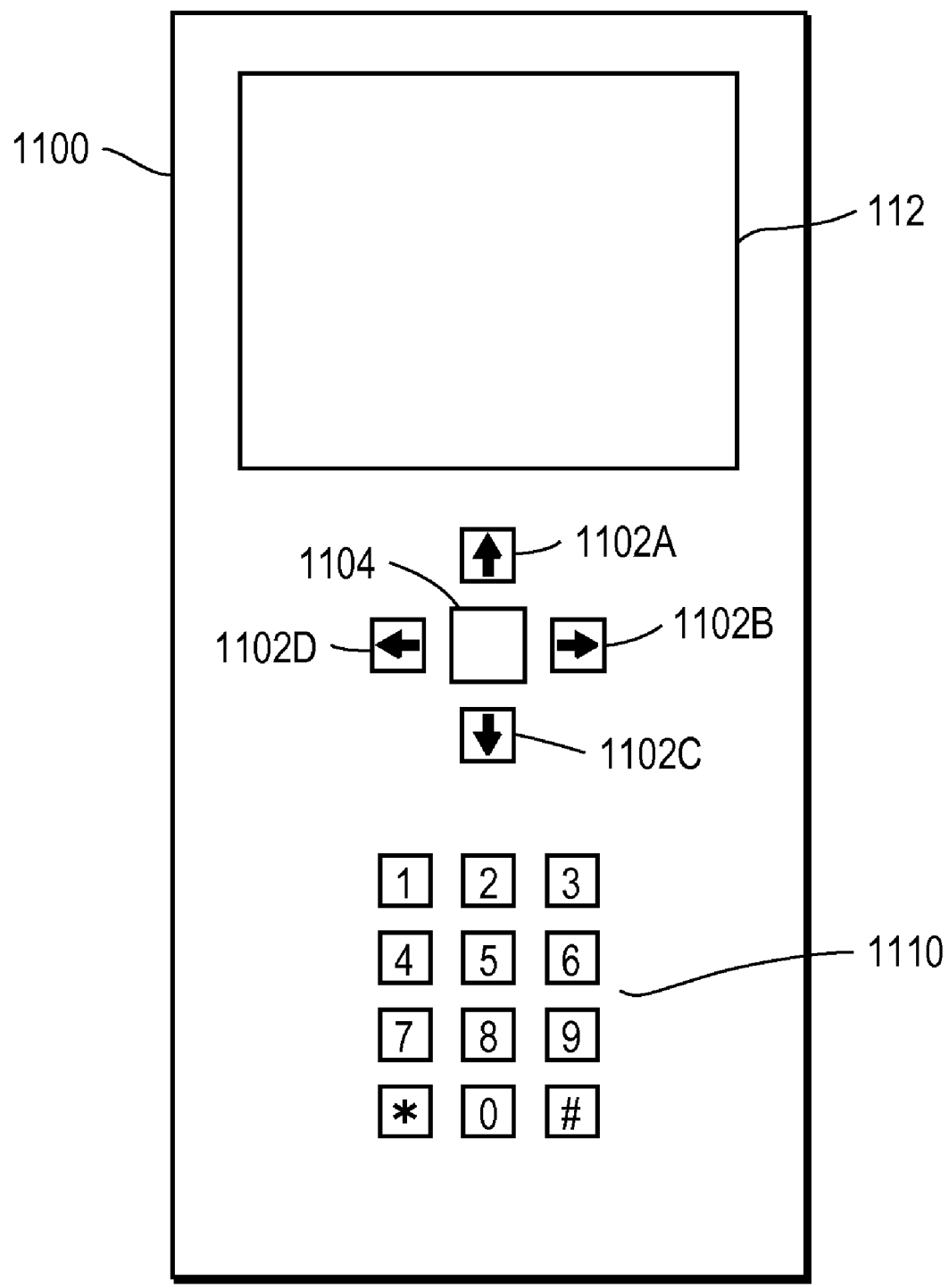
FIG. 11 illustrates a mobile device with a navigation panel.

One set of events are the bank selection events, also referred to as directional events because each bank is associated with a particular direction. In one embodiment, the directional events are created using a navigation panel commonly found on mobile devices. FIG. 11 illustrates a mobile device with a navigation panel. The mobile device 1100 has a display 112, a navigation panel 1108, and a keypad 1110. The navigation panel 1108 has four directional buttons 1102 that can be pressed to select banks. For example, a user presses button 1102D to select the left bank in FIG. 2.

Figure 12:
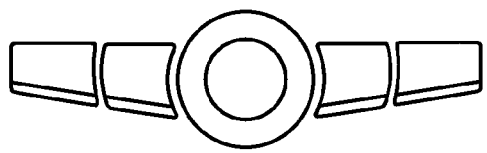
FIG. 12 illustrates different navigation panels from various mobile devices.
Figure 12:
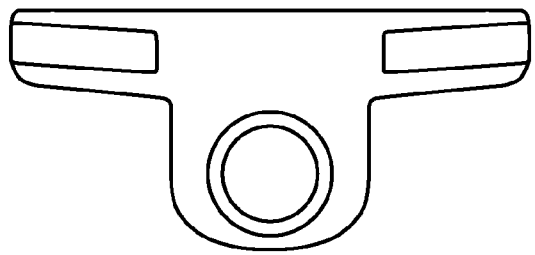
Figure 12:
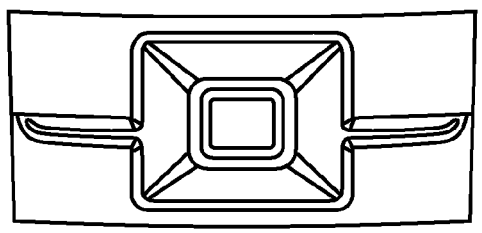
Figure 12:
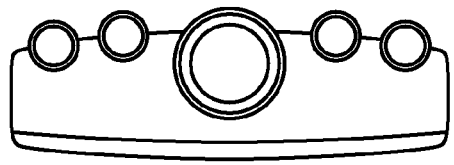
Figure 12:
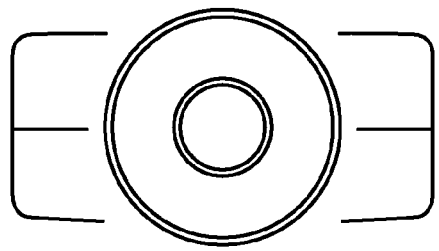
Figure 12:
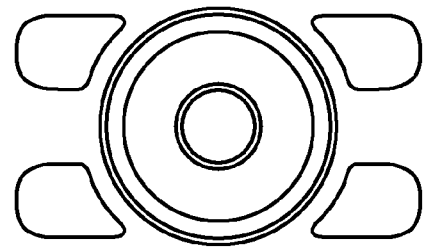
Figure 12:
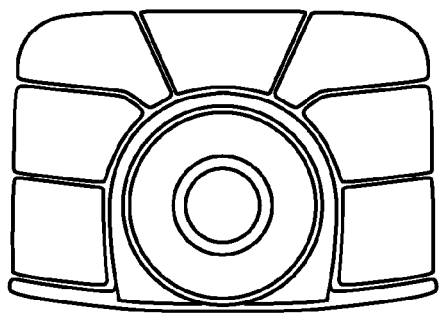
Figure 12:
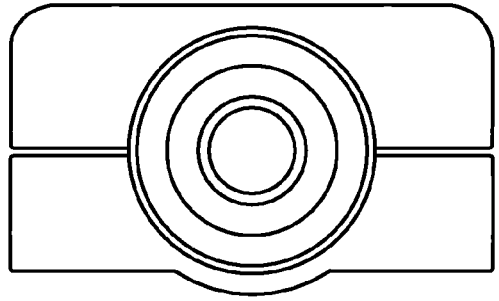

Similar input devices capable of producing a directional input can be used. Several such input devices from various mobile devices are shown in FIG. 12. The input devices can also be trackballs or joysticks. The user can press buttons on the edges of a mobile device 1100 or apply pressure to the edges of the mobile device to generate bank selection events. If the display 112 is touch sensitive, the user can directly touch the displayed bank with a finger or stylus to select it.

Various gestures made by a user can also be analyzed by the user input module 116 to determine an appropriate directional event to create. A user can make a stroke on a touchpad or touch sensitive screen, and the direction of the stroke can be determined. For example, a stroke to the right can select the right bank. Since gestures can be made rapidly by users, the bank selection events can be rapidly generated in this way.

Navigation panel 1108 provides four buttons that produce discrete inputs that the user input module 116 translates into directional events. However, other devices such as a trackball may provide a horizontal magnitude of navigational motion, $\Delta x$, and a vertical magnitude of navigational motion, $\Delta y$. A negative $\Delta x$ corresponds to a move left, a positive $\Delta x$ corresponds to a move right, a negative $\Delta y$ corresponds to a move downwards, and a positive $\Delta y$ corresponds to a move upwards. These magnitudes can be converted into directional events by the user input module as follows:

right: if $|\Delta x|>|\Delta y|$ and $\Delta x>0$,
left: if $|\Delta x|>|\Delta y|$ and $\Delta x\leq 0$,
up: if $|\Delta x|<|\Delta y|$ and $\Delta y>0$,
down: if $|\Delta x|\leq|\Delta y|$ and $\Delta y\leq 0$, Some trackball devices are very sensitive and report even very slight movements. Jitter elimination can be used to prevent such slight movements from producing a bank selection event. One way to implement jitter elimination is to ignore trackball movements with amplitudes less than certain values. For example, trackball events are ignored if $\sqrt{\Delta x^2+\Delta y^2}$ is less than some pre-defined small value.

Figure 13:
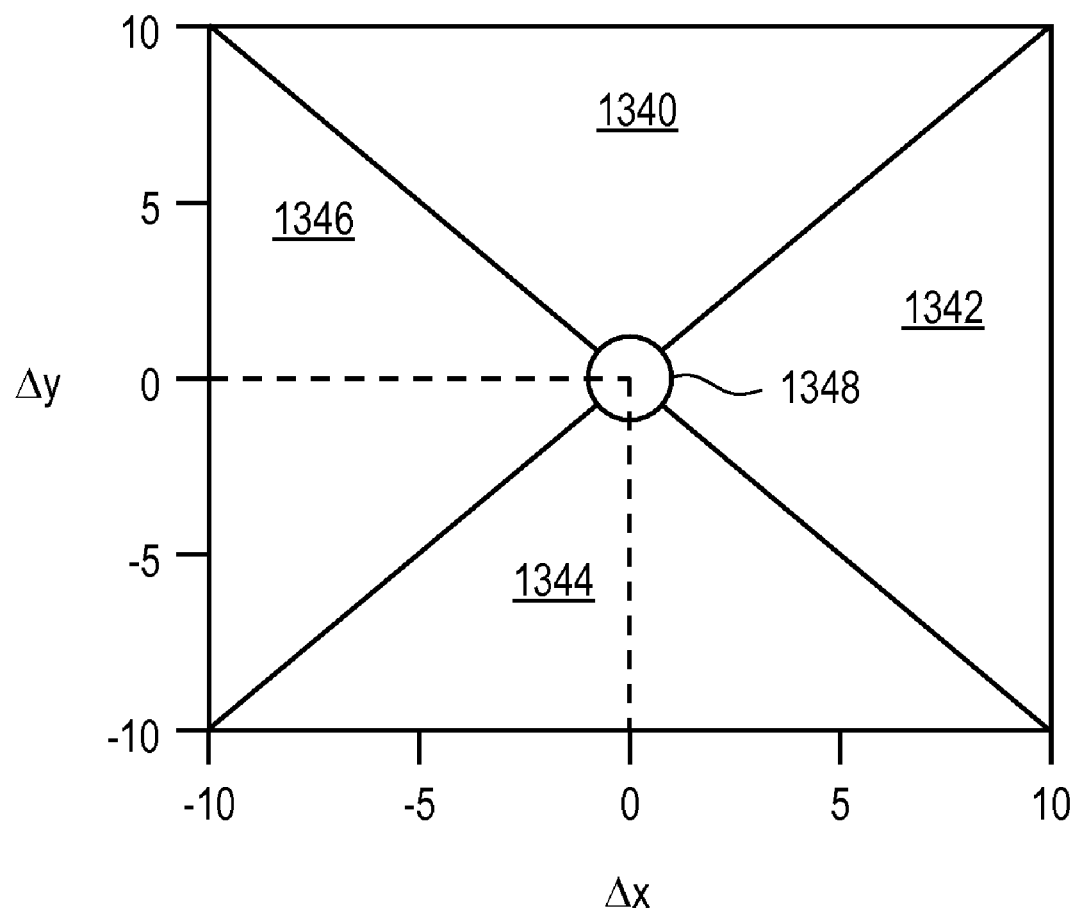
FIG. 13 illustrates a mapping from a range of trackball inputs to discrete directional events.
Figure 14:
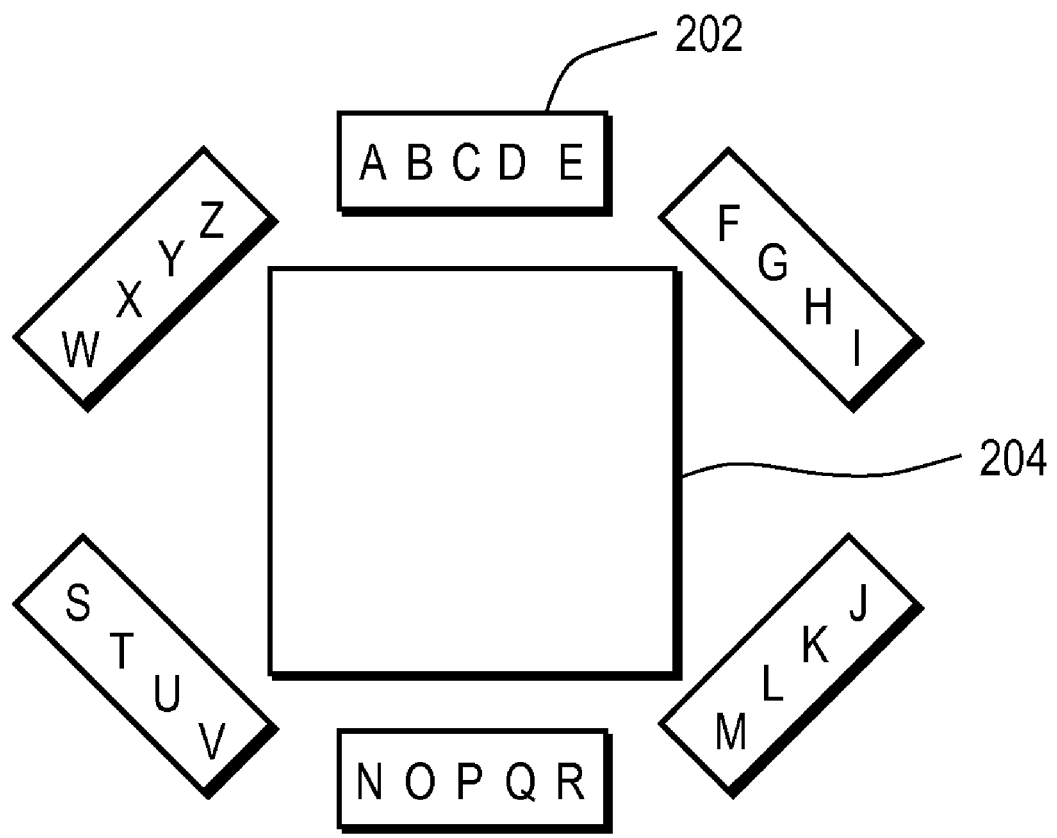
FIG. 14 illustrates a configuration with six banks placed around a list display area.

FIG. 13 illustrates a mapping from a range of trackball inputs to directional events. The horizontal and vertical axes represent $\Delta x$ and $\Delta y$ respectively. Movements in region 1340 select the upper bank, movements in region 1342 select the right bank, movements in region 1344 select the lower bank, and movements in region 1346 select the left bank. The implementation of jitter elimination results in movements in region 1348 being ignored.

Bank selection events can also be produced by inputs to a keyboard or similar device. In an example four-bank configuration, certain keys on the keyboard can be assigned to each directional bank. For example, pressing 'A' can select the left bank, 'L' can select the right bank, and so on. The arrow keys on the keyboard can also be used to specify directional banks. Multiple keys can be assigned to a bank, such as assigning the 'A', 'S', 'D', 'F', and 'G' keys to the left bank. Note that the letter keys that are pressed to create a bank selection event can be different than the letters in the bank.

On mobile phones equipped with a standard phone numeric keyboard, numbered keys can generate bank selection events that result in the selection of additional banks that do not appear on the display 112. For example, key 3 is associated with the letters 'G', 'H', and 'J', and pressing this key results in the selection of a bank containing the letters G, H, and J, even if there are other banks displayed on the display containing those letters. On a full keyboard, the individual keys can be pressed to generate events to select undisplayed banks containing only a single letter corresponding to the key. Keys on a numeric keypad or keyboard can be used to select additional banks in combination with directional keys that are used to select the banks shown on the display. For example, a first bank selection can be for a displayed directional bank, and the next bank selection can be for a three-letter bank associated with a key of a numeric keypad.

In addition to the bank selection events, there are various other events that the user creates. There is a scrolling mode entry event and a selection event in scrolling mode. These events can be created by the user pressing the center button of a navigation panel, such as button 1104 in FIG. 11. In scrolling mode there are also cursor up and cursor down events to move the cursor. These events can be generated through the directional buttons 1102A and 1102C. Various other methods apparent to those skilled in the art can be used to generate these events from a variety of input devices.

Optional events such as backspace or reset can also be part of the user interface. A backspace event (also referred to as an undo event) can undo the previous event. For example, a backspace event can undo the most recent bank selection event and increase the size of the current result list. The reset event can take the user back to the initial selection screen illustrated in FIG. 2. The user can generate these events by pressing buttons on the electronic device that have been assigned to the events. These events can also be generated by buttons or menus displayed on the screen 112, such as the "Back" button 212 in FIG. 2. These on-screen buttons can be selected by standard methods such as a user pressing menu keys provided on the device.

The event generation methods described above provide several advantages. The user can generate all events necessary to select an entry from a list with one hand using most input devices, including those described above. The input device can also be small and can fit on a mobile device. In fact most mobile devices include a navigation panel that can be used for selecting directional banks. The experienced user who is familiar with the input device and the bank configuration does not need to look at the screen 112 or input device to make bank selections and select an entry.

Bank Configuration

The banks 202 provided for user selection can have various configurations. In FIG. 2, there are four banks displayed at the four edges of the list display area 204. The banks contain letters grouped based on regions of the standard QWERTY keyboard (consecutive keys of Q-W-E-R-T-Y in a row). The upper bank contains letters corresponding to the top row of the keyboard, the left and right banks contain letters corresponding to the left and right portions of the middle row of the keyboard, and the lower bank contains letters corresponding to the bottom row of the keyboard.

An alternative configuration is for the letters in the banks to be grouped alphabetically, where the upper bank contains 'ABCDEFG', left bank contains 'HIJKLMN', the right bank contains 'OPQRSTU', and the lower bank contains 'VWXYZ'. Other configurations include groupings based on the AZERTY keyboard, Dvorak keyboard, double-byte characters, and the like.

Letters may be grouped into banks in various other ways. The same letter may also be contained in more than one bank. The banks may contain numbers or other symbols. The number of banks may also vary. FIG. 13 illustrates a configuration with six banks 202 placed around a list display area 204. Such a bank configuration may work well with a six-direction input device Several factors can be considered when determining bank configuration. Dividing the letters among a larger number of banks allows the user to specify a smaller set of letters when choosing a bank, generally resulting in a faster narrowing of the current result list. However, bank selection event generation becomes more complex with more banks because a wider range of inputs are produced by the user.

For a given number of banks, there are many options for grouping the letters into particular banks. It may be desirable to configure banks so that the user can more easily remember the letters contained in a bank. The QWERTY keyboard-based bank configuration described above may be more easily remembered by users familiar with such a keyboard. It is not necessary for users to memorize the letters contained in the banks since the banks are displayed on display 112. However, users who do memorize the bank configuration may achieve faster bank selection speeds by avoiding having to visually scan the banks.

Banks may also be configured to minimize the number of events issued by the user to select items. As described above, an event is required for each bank selection, and additional events can be required to enter scrolling mode, to move the cursor 902 in scrolling mode, and to select the desired entry in scrolling mode. The letters may be distributed among the banks to minimize the number of such events needed to select an item on average. Generally this can be achieved by distributing in multiple banks the frequently occurring letters from the list entries instead of having many frequently occurring letters in a single bank. However, the optimal strategy for distributing letters among the banks depends on the letter compositions of the list entries and on the frequency of access to each list entry. The bank configurations can vary dynamically based on algorithms implemented in the electronic device that determine optimal bank configurations based on the list entries and usage patterns.

Some portions of above description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for list entry selection. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present disclosure disclosed herein without departing from the spirit and scope of the invention as defined in the appended claims.

APPENDIX A

Listed below are the names in the Example List used in the embodiments presented above.

Agatha Christie
Albert Camus
Aldous Huxley
Alex Haley
Alice Walker
Allen Ginsberg
Amy Tan
Anais Nin
Arthur C. Clarke
Arthur Conan Doyle
Arthur Miller
Ayn Rand
Barbara Kingsolver
Bernard Malamud
C. S. Lewis
Charles Bukowski
D. H. Lawrence
Danielle Steel
Dorothy Parker
Dr. Seuss
E. B. White
E. M. Forster
Edgar Rice Burroughs
Edith Wharton
Edward Albee
Ernest Hemingway
Ernie Pyle
Eudora Welty
Eugene O'Neill
F. Scott Fitzgerald
Flannery O'Connor
Gabriel Garcia Marquez
George Orwell
Graham Greene
Harper Lee
Herman Wouk
Hunter S. Thompson
Isaac Asimov
Isabel Allende
J. D. Salinger
J. R. R. Tolkien
Jack Kerouac
Jack London
James Baldwin
James Joyce
James Michener
John Cheever
John Grisham
John Irving
John McPhee
John Steinbeck
John Updike Jorge Luis Borges
Joseph Conrad
Judy Blume
Kurt Vonnegut
Langston Hughes
Laura Ingalls Wilder
Marcel Proust
Margaret Atwood
Maya Angelou
Milan Kundera
Octavia E. Butler
Pablo Neruda
Ralph Ellison
Ray Bradbury
Raymond Carver
Roald Dahl
Robert Frost
Robert Heinlein
Rod Serling
Saul Bellow
Shel Silverstein
Sinclair Lewis
Stephen King
Sylvia Plath
T. S. Eliot
Tennessee Williams
Thomas Mann
Thomas Pynchon
Tom Robbins
Tom Wolfe
Toni Morrison
Truman Capote
Upton Sinclair
Ursula K. Le Guin
Virginia Woolf
Vladimir Nabokov
W. Somerset Maugham
W. H. Auden
Willa Cather
William Faulkner
William Golding
William Styron
William Butler Yeats
Winston Churchill
Zora Neale Hurston

What is claimed is:

1. A method for selecting an entry from a list of entries on an electronic device, comprising:
    displaying a plurality of banks;
    receiving a bank selection event for selecting a bank from the plurality of banks, the selected bank containing a set of characters;
    appending the set of characters to a prefix, where the set of characters occupies a single position of the prefix;
    determining a current result list of entries that match the prefix, the current result list of entries being a subset of the list of entries, wherein determining the current result list of entries that match the prefix further comprises determining entries that contain a sequence of characters such that each character in a particular position of the sequence is contained in the set of characters at the same position of the prefix, and wherein the sequence of characters is at any location within the matched entry;
    reducing the list of entries to the current result list of entries;
    displaying the current result list of entries; and
    highlighting at least one character in each entry of the current result list of entries, the highlighted characters matching the prefix.

2. The method of claim 1, further comprising:
    receiving a scrolling mode entry event for entering a scrolling mode;
    receiving an entry selection event for selecting an entry from the current result list of entries while in scrolling mode; and
    performing a predetermined action on the selected entry.

3. The method of claim 1, wherein the bank selection event is generated by an input device, the input device being a navigation device, a trackball, a joystick, a numeric keypad, a touch screen, or a keyboard.

4. The method of claim 1, wherein the sequence of characters begins at a first character of a word in a matched entry.

5. The method of claim 1, wherein the sequence of characters spans a plurality of words.

6. The method of claim 1, wherein the sequence of characters wraps around from the last character of a matched entry to the first character of the matched entry.

7. The method of claim 1, wherein more than one sequence of characters in a matched entry matches the prefix.

8. A computer readable medium storing instructions thereon for selecting an entry from a list of entries on an electronic device, the instructions when executed by a processor cause the processor to:
    display a plurality of banks;
    receive a bank selection event for selecting a bank from the plurality of banks, the selected bank containing a set of characters;
    append the set of characters to a prefix, where the set of characters occupies a single position of the prefix;
    determine a current result list of entries that match the prefix, the current result list of entries being a subset of the list of entries, wherein determining the current result list of entries that match the prefix further comprises determining entries that contain a sequence of characters such that each character in a particular position of the sequence is contained in the set of characters at the same position of the prefix, and wherein the sequence of characters is at any location within the matched entry;
    reduce the list of entries to the current result list of entries;
    display the current result list of entries; and
    highlight at least one character in each entry of the current result list of entries, the highlighted characters matching the prefix.

9. The computer readable medium of claim 8, further comprising instructions when executed by a processor cause the processor to:
    receive a scrolling mode entry event for entering a scrolling mode;
    receive an entry selection event for selecting an entry from the current result list of entries while in scrolling mode; and
    performing a predetermined action on the selected entry.

10. The computer readable medium of claim 8, wherein the bank selection event is generated by an input device, the input device being a navigation device, a trackball, a joystick, a numeric keypad, a touch screen, or a keyboard.

11. The computer readable medium of claim 8, wherein the sequence of characters begins at a first character of a word in a matched entry.

12. The computer readable medium of claim 8, wherein the sequence of characters spans a plurality of words.

13. A system for selecting an entry from a list of entries on an electronic device, the system comprising:

a user input module for receiving a bank selection event for selecting a bank from a plurality of banks, the selected bank containing a set of characters;

a bank selection mode module for appending the set of characters to a prefix, where the set of characters occupies a single position of the prefix, for determining a current result list of entries that match the prefix, the current result list of entries being a subset of the list of entries, and for reducing the list of entries to the current result list of entries, wherein determining the current result list of entries that match the prefix further comprises determining entries that contain a sequence of characters such that each character in a particular position of the sequence is contained in the set of characters at the same position of the prefix, and wherein the sequence of characters is at any location within the matched entry; and a user interface module for displaying a plurality of banks, for displaying the current result list of entries, and for highlighting at least one character in each entry of the current result list of entries, the highlighted characters matching the prefix.

14. The system of claim 13, further comprising:

a scrolling mode module for receiving a scrolling mode entry event for entering a scrolling mode, for receiving an entry selection event for selecting an entry from the current result list of entries while in scrolling mode; and a entry action module for performing a predetermined action on the selected entry.

15. The system of claim 13, wherein the bank selection event is generated by an input device, the input device being a navigation device, a trackball, a joystick, a numeric keypad, a touch screen, or a keyboard.

16. The system of claim 14, wherein the sequence of characters begins at a first character of a word in a matched entry.

17. The system of claim 14, wherein the sequence of characters spans a plurality of words.

* * * * *